United States Patent [19]

Shinjo

[11] Patent Number: 5,126,663
[45] Date of Patent: Jun. 30, 1992

[54] HALL EFFECT SENSOR WITH A PROTECTIVE SUPPORT DEVICE

[75] Inventor: Izuru Shinjo, Himeji, Japan

[73] Assignee: Mitsubishi Denki K.K., Tokyo, Japan

[21] Appl. No.: 661,931

[22] Filed: Feb. 27, 1991

[30] Foreign Application Priority Data

Mar. 1, 1990 [JP] Japan .................... 19473[U]

[51] Int. Cl.$^5$ .............. G01B 7/30; F02P 7/00; G01P 3/44
[52] U.S. Cl. .............. 324/207.2; 324/207.25; 123/617
[58] Field of Search ............ 324/173, 174, 207.2, 324/207.21, 207.25, 251, 252; 338/32 H, 32 R; 123/617, 146.5 A

[56] References Cited

U.S. PATENT DOCUMENTS 4,235,213  11/1980  Jellissen ................. 123/617
5,014,005  5/1991   Murata et al. ........... 324/207.2

FOREIGN PATENT DOCUMENTS 3149826  7/1983  Fed. Rep. of Germany.
3732958  5/1990  Fed. Rep. of Germany.
276174   of 1990 Japan.

OTHER PUBLICATIONS

"Designs of semiconducting magnetic field sensors" by W. Heidenrich in Technisches Messen tm 56 (1989) 11, S. 436-443.

"Harnessing the Hall effect for today's technology" by Douglas White in Sensor Review Apr. 1989 S. 91-94.

"Funktion und Anwendung der Hall-Magnet-Gabelschranke HKZ101" by Ulrich Lachmann in Siemens Components 20 (1982) Heft 3, S. 73-75.

Primary Examiner—Walter E. Snow
Attorney, Agent, or Firm—Sughrue, Mion, Zinn, Macpeak & Seas

[57] ABSTRACT

A Hall effect type sensing device comprising a casing (20); a magnet (22), a first magnetic flux guide (21a) and a second magnetic flux guide (21b) which define a magnetic circuit; a Hall transducer (24) arranged to be opposite to the magnet (22) in the magnetic circuit; a board (23) for supporting the Hall transducer (24); an air gap formed between the magnet (22) and the Hall transducer (24); a magnetic flux shutter (5) which can shunt a magnetic flux in the air gap, and which passes through the air gap to cause a change in the magnetic flux, the change being detected by the Hall transducer (24); and an urging member (30) including a supporting arm (30a) for supporting a Hall IC assembly and an urging arm (30b) for urging the supporting arm (30a) to an inner wall of the casing (20), the Hall IC assembly being constituted by the second magnetic flux guide (21b), the Hall transducer (24) and the board (23); wherein the Hall IC assembly is located by an urging force of the urging member (30).

6 Claims, 2 Drawing Sheets

HALL EFFECT SENSOR WITH A PROTECTIVE SUPPORT DEVICE

BACKGROUND OF THE INVENTION

1. Field of the Invention

The present invention relates to a Hall effect type sensing device which can be used, for example, for detecting a crank angle in a distributor for internal combustion engine ignition systems.

2. Discussion of Background

Referring to FIG. 3, there is shown a partial cross sectional view of an example of a conventional internal combustion engine ignition distributor. Reference numeral 1 designates a distributor housing. Reference numeral 2 designates a distributor cap which is used to cover an opening in the housing 1. Reference numeral 3 designates a distributor shaft which is rotatably supported by the housing 1, and which is rotated in synchronism with an crank shaft (not shown) of an internal combustion engine. Reference numeral 4 designates a Hall effect type sensing device which is fixed within the housing 1. Reference numeral 5 designates a vane which can be carried on the distributor shaft 3 to rotate therewith as one unit, which can be made of magnetic material to work as a magnetic flux shutter, and which is formed in a circular shape and has the periphery formed as downwardly extending bent portions 5a, the bent portions being equally spaced at 90° etc. apart. The bent portions 5a can be formed to pass through an air gap 6 which is formed in the Hall effect type sensing device 4.

Reference numeral 7 designates a distributor rotor which is fixed to the leading end of the distributor shaft 3 to rotate therewith as one unit, and which carries a rotor electrode 9. The electrode 9 is in sliding contact with a central electrode 8 which is arranged in the cap 2. Reference numeral 10 designates peripheral electrodes which are arranged within the cap 2 to correspond to ignition plugs (not shown) of the cylinders of an internal combustion engine (not shown). The secondary voltage of an ignition coil (not shown) is supplied to the peripheral electrodes 10 through the rotor electrode 9 according to the firing order, thereby sparking the ignition plugs.

Referring now to FIG. 4, there is shown an enlarged cross sectional view of the Hall effect type sensing device 4 shown in FIG. 3. Reference numeral 20 designates a casing which is made of thermoplastic resin. Reference numeral 21a designates a first magnetic flux guide which is in the form of L character in section, and which is housed in the casing 20. Reference numeral 22 designates a permanent magnet which is bonded to the first magnetic flux guide 21a. Reference numeral 23 designates a ceramic board which is housed in the casing 20. Reference numeral 24 designates a Hall transducer which is mounted on the ceramic board 23. Reference numeral 21b designates a second magnetic flux guide which is in the form of L character in section, which is bonded to the Hall transducer 24, and which is arranged to be opposite to the first magnetic flux guide 21a.

In the internal combustion ignition distributor having such structure, when the distributor shaft 3 is rotated by the crank shaft of the internal combustion engine, the vane 5 which is fixed to the distributor shaft 3 as one unit is also rotated. Each time the respective bent portions 5a have passed through the air gap 6, the bent portions 5a shunt the magnetic flux which extends from the magnet 22 toward the Hall transducer 24. In other words, when one of the bent portions 5a which are made of magnetic material is passing through the air gap 6, the magnetic flux from the magnet 22 is directed to the first magnetic flux guide 21a through that bent portion 5a to prevent the magnetic flux from through the Hall transducer 24. As a result, a change in the magnetic flux is given to the Hall transducer 24, depending on the revolution of the distributor shaft 3. The Hall transducer 24 converts the change in the magnetic flux into an electric signal, which is in turn transmitted to an ignition timing control unit (not shown) to control the primary current of the ignition coil, thereby causing the secondary voltage to generate in the ignition coil at every ignition timing. The secondary voltage is fed through the central electrode 8 and the rotor electrode 9 to the peripheral electrodes 10 in the firing order, depending on the distributor rotor 7. In this way, the cylinder ignition plugs are fired in the firing order, allowing the internal combustion engine to be continuously driven.

In the Hall effect type sensing device 4, distance variations between the magnet 22 and the hall transducer 24 have significant effects on crank shaft angle detection accuracy. Although forcibly positioning the magnet 22 to the casing 20 is allowed by e.g. fit, positioning the Hall transducer 24 can not be made in a similar manner because it is an electronic part. When a Hall IC assembly which is constituted by the ceramic board 23, the Hall transducer 24 and the second magnetic flux guide 21b is press-fitted into the casing for positioning, there is a possibility that the ceramic board 23 could be damaged, or that a change in properties of the Hall transducer 24 could be caused due to distortion of the Hall transducer. In order to eliminate such possibility, the Hall IC assembly has to be mounted into the casing 20 to have a clearance 25 between itself and the wall of the casing 20.

The conventional hall effect type sensing device 4 constructed as stated earlier has such an arrangement that the Hall IC assembly is mounted in the casing 20 to have the clearance 25 between itself and the wall of the casing 20. This arrangement creates a problem in that a variation in distance between the magnet 22 and the Hall transducer 24 produces a change in the magnetic flux from the magnet 22 to the Hall transducer 24 to have an adverse effect upon a crank shaft angle detection accuracy.

SUMMARY OF THE INVENTION

It is an object of the present invention to resolve the problem, and to provide a Hall effect type sensing device capable of mounting a Hall IC assembly into a casing without damage, of having a constant distance between a magnet and the Hall IC assembly, and of realizing accurate detection.

The foregoing and other objects of the present invention have been attained by providing a Hall effect type sensing device comprising a casing; a magnet, a first magnetic flux guide and a second magnetic flux guide which define a magnetic circuit; a Hall transducer arranged to be opposite to the magnet in the magnetic circuit; a board for supporting the Hall transducer; an air gap formed between the magnet and the Hall transducer; a magnetic flux shutter which can shunt a magnetic flux in the air gap, and which passes through the air gap to cause a change in the magnetic flux, the change being detected by the Hall transducer; and an urging member including a supporting arm for supporting a Hall IC assembly and an urging arm for urging the supporting arm to the inner wall of the casing, the Hall IC assembly being constituted by the second magnetic flux guide, the Hall transducer and the board; wherein the Hall IC assembly is located by an urging force of the urging member.

In accordance with the present invention, the Hall IC assembly is brought closer to the inner wall of the casing by the urging force of the urging member to be located, thereby making the distance between the magnet and the Hall transducer constant.

As a result, the Hall IC assembly can be mounted in the casing without damage, and the distance between the magnet and Hall IC assembly can be maintained constant, thereby offering an advantage in that e.g. a crank shaft angle can be correctly detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Now, the present invention will be described in detail with reference to a preferred embodiment illustrated in the accompanying drawings.

Figure 1:
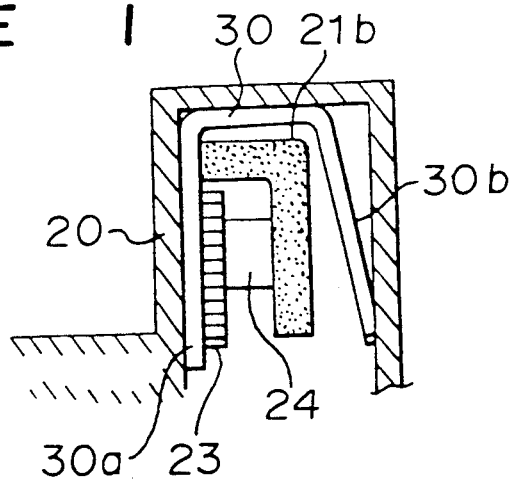
FIG. 1 is a cross sectional view of the essential parts of an embodiment according to the present invention.
Figure 4:
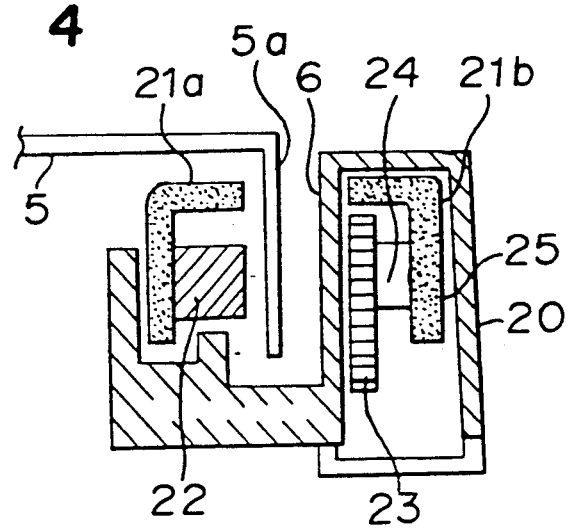
FIG. 4 is a cross sectional view of the essential parts of the conventional Hall effect type sensing device.
Figure 3:
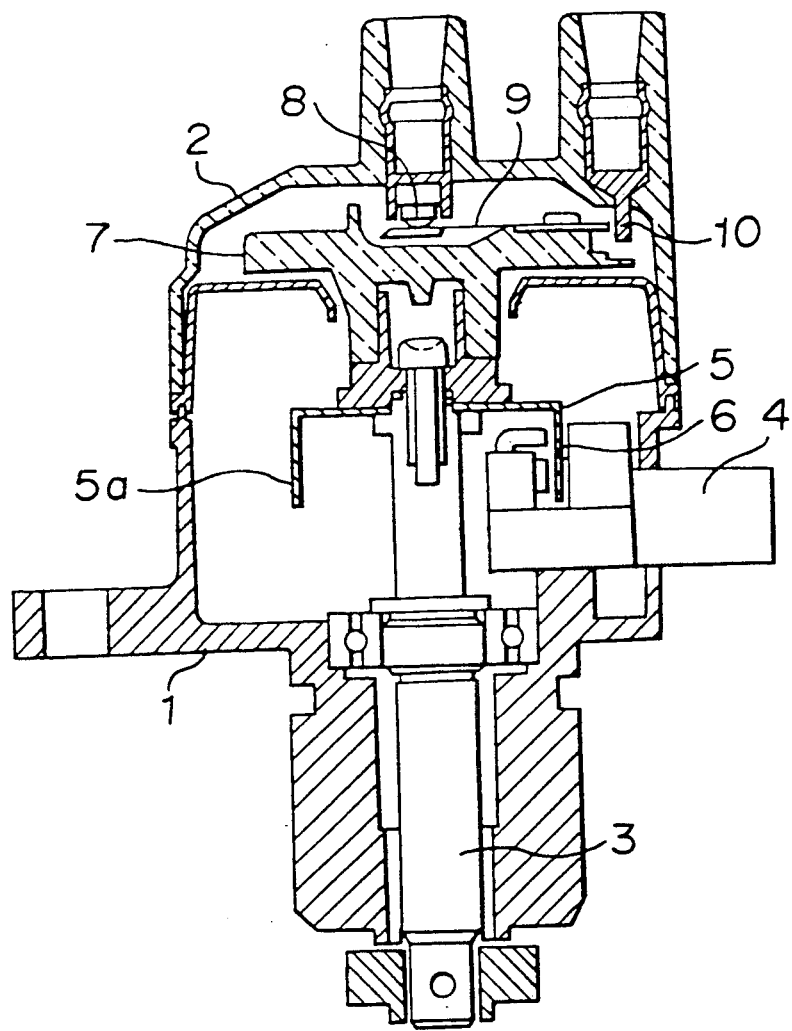
FIG. 3 is a cross sectional view of an internal combustion engine ignition distributor with which a conventional Hall effect type sensing device is incorporated.

FIG. 1 is a cross sectional view showing the essential parts of the Hall effect type sensing device of the embodiment according to the present invention. In FIG. 1, identical or corresponding parts are indicated by the same reference numerals as those shown in FIGS. 3 and 4, and explanation on those parts will be omitted for the sake of simplicity.

In FIG. 1, reference numeral 30 designates an urging member which comprises a supporting arm 30a and an urging arm 30b. The urging member 30 is made of a stainless steel, and can give an urging force. A ceramic board 23, a Hall transducer 24 and a second magnetic flux guide 21b constitute a Hall IC assembly. The supporting arm 30a has the Hall IC assembly bonded thereto. In a casing 20, the Hall IC assembly is mounted at a predetermined location together with the urging member 30.

Figure 2:
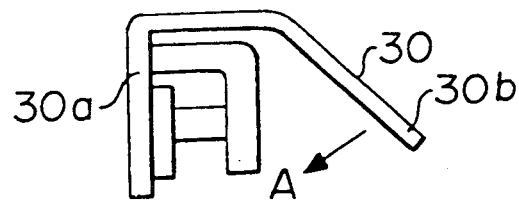
FIG. 2 is a side view showing the urging member shown in FIG. 1.

Referring now to FIG. 2, there is a side view showing the urging member 30 which has not the Hall IC assembly mounted in the casing 20. The urging member 30 has such structure that the urging arm 30b is bent at an obtuse angle in a free state, and that the urging arm 30b is urged toward the direction of an arrow A when the Hall IC assembly has been mounted in the casing 20.

The Hall effect type sensing device constructed in such manner allows the supporting arm 30a to be urged against the inner wall surface of the casing 20 by an elastic force of the urging arm 30b when the Hall IC assembly has been mounted into the casing 20. As a result, the Hall IC assembly supported by the supporting arm 30a can be located at the predetermined position in the casing 20 to maintain the distance between a magnet 22 and the Hall transducer 24 constant at all the times. No urging force is applied from the urging arm 30b to the Hall IC assembly. In this manner, there is no possibility that the ceramic board 23 is damaged, and that a change in properties in the Hall transducer 24 is caused due to its distortion.

Although the explanation of the embodiment has been made for the case wherein the Hall effect type sensing device is used to detect an crank shaft rotation angle, the Hall effect type sensing device according to the present invention is also applicable to detect a steering wheel turning angle, an electric motor revolution and the like.

Obviously, numerous modifications and variations of the present invention are possible in light of the above teachings. It is therefore to be understood that within the scope of the appended claims, the invention may be practiced otherwise than as specifically described herein.

What is claimed is:

1. A Hall effect type sensing device comprising:
   a casing (20);
   a magnet (22), a first magnetic flux guide (21a) and a second magnetic flux guide (21b) which define a magnetic circuit;
   a Hall transducer (24) arranged to be opposite to the magnet (22) in the magnetic circuit;
   a board (23) for supporting the Hall transducer (24);
   an air gap formed between the magnet (22) and the Hall transducer (24);
   a magnetic flux shutter (5) which can shunt a magnetic flux in the air gap, and which passes through the air gap to cause a change in the magnetic flux, the change being detected by the Hall transducer (24); and
   an unitary urging member (30) having a supporting end (30a) for supporting a Hall IC assembly and an urging end (30b) for urging the supporting end (30a) to an inner wall of the casing (20), the Hall IC assembly including the second magnetic flux guide (21b), the Hall transducer (24) and the board (23); wherein said urging member supports the Hall IC assembly at a predetermined position without applying an urging force upon said Hall transducer.

2. A Hall effect type sensing device according to claim 1, wherein the urging member (30) has the Hall IC assembly bonded to the supporting end (30a).

3. A Hall effect type sensing device according to claim 1, wherein the urging member (30) has the urging end (30b) bent at an obtuse angle in a free state.

4. A Hall effect type sensing device according to claim 1, wherein the supporting end (30a) is urged against the inner wall of the casing (20) by the urging end.

5. A Hall effect type sensing device according to claim 1, wherein said supporting and urging ends form an obtuse angle therebetween, said Hall transducer bonded to a side of said supporting end facing said urging end.

6. A Hall effect type sensing device according to claim 1, wherein said urging end maintains said supporting end at said predetermined position, said Hall IC assembly being bonded to said supporting end.

* * * * *